United States Patent
Hatta et al.

(10) Patent No.: US 9,186,855 B2
(45) Date of Patent: Nov. 17, 2015

(54) HIGH-PRESSURE GAS TANK PRODUCTION METHOD

(71) Applicants: TOYOTA JIDOSHA KABUSHIKI KAISHA, Toyota-shi (JP); MURATA MACHINERY, LTD., Kyoto-shi (JP)

(72) Inventors: Ken Hatta, Okazaki (JP); Motohiro Tanigawa, Kyoto (JP); Tadashi Uozumi, Kyoto (JP)

(73) Assignees: TOYOTA JIDOSHA KABUSHIKI KAISHA, Toyota-Shi (JP); MURATA MACHINERY, LTD., Kyoto-Shi (JP)

( * ) Notice: Subject to any disclaimer, the term of this patent is extended or adjusted under 35 U.S.C. 154(b) by 0 days.

(21) Appl. No.: 14/380,756

(22) PCT Filed: Feb. 5, 2013

(86) PCT No.: PCT/JP2013/000611
§ 371 (c)(1),
(2) Date: Aug. 25, 2014

(87) PCT Pub. No.: WO2013/128800
PCT Pub. Date: Sep. 6, 2013

(65) Prior Publication Data
US 2015/0034233 A1    Feb. 5, 2015

(30) Foreign Application Priority Data
Feb. 27, 2012   (JP) .................. 2012-039982

(51) Int. Cl.
*B29C 53/58*    (2006.01)
*B29D 22/00*    (2006.01)
(Continued)

(52) U.S. Cl.
CPC ............... *B29D 22/00* (2013.01); *B29C 70/86* (2013.01); *F17C 1/06* (2013.01); *B29L 2022/00* (2013.01); *F17C 2201/0109* (2013.01);
(Continued)

(58) Field of Classification Search
CPC ................. F17C 1/06; F17C 2209/232; F17C 2201/0109; F17C 2203/0656; F17C 2203/0663; F17C 2203/67; F17C 2209/2154; F17C 2223/0123; F17C 2223/035; F17C 2223/036; F17C 2203/0602; F17C 2203/0604; F17C 2209/22; B29C 70/86
USPC ............... 156/172, 174, 250, 168; 242/476.1, 242/487.6, 476.3, 476.5, 475.7, 475.1
See application file for complete search history.

(56) References Cited

U.S. PATENT DOCUMENTS

2001/0028015 A1 * 10/2001 Yasui et al. ................ 242/487.6

FOREIGN PATENT DOCUMENTS

JP       2010-005965 A     1/2010

*Primary Examiner* — Jacob T Minskey
*Assistant Examiner* — Vishal I Patel
(74) *Attorney, Agent, or Firm* — Kenyon & Kenyon LLP

(57) ABSTRACT

The FW technique is employed to suppress a non-fiber-wound space from being left during formation of a fiber layer for reinforcement on a liner. A process of forming a fiber-reinforce resin layer on a liner winds and fixes a winding start end fiber of a resin-impregnated carbon fiber on a fiber fixation flange, which is away from the top of a dome section. The process subsequently forms an innermost helical layer from the winding start end fiber extended from the fixation position and the subsequently fed resin-impregnated carbon fiber. The process subsequently forms an inner hoop layer over the innermost helical layer and cuts the winding start end fiber extended from the fixation position of the fiber fixation flange at a position on the periphery of the top of the dome section, prior to formation of a subsequent second helical layer.

3 Claims, 5 Drawing Sheets

(51) Int. Cl.
   *F17C 1/06* (2006.01)
   *B29C 70/86* (2006.01)
   *B29L 22/00* (2006.01)
(52) U.S. Cl.
   CPC .................. *F17C 2203/0602* (2013.01); *F17C 2203/0604* (2013.01); *F17C 2203/067* (2013.01); *F17C 2203/0656* (2013.01); *F17C 2203/0663* (2013.01); *F17C 2209/2154* (2013.01); *F17C 2209/22* (2013.01); *F17C 2209/232* (2013.01); *F17C 2223/0123* (2013.01); *F17C 2223/035* (2013.01); *F17C 2223/036* (2013.01)

PROVIDE RESIN CONTAINER AS LINER

FORM FIBER-REINFORCED RESIN LAYER ON OUTER CIRCUMFERENCE OF LINER

THERMALLY CURE FIBER-REINFORCED RESIN LAYER

LOW-ANGLE HELICAL LAYER
(LOW-ANGLE HELICAL WINDING)

HOOP LAYER (HOOP WINDING)

S100 : FIX WINDING START END

S110 : FORM INNERMOST HELICAL LAYER (HELICAL WINDING)

S120 : FORM INNER HOOP LAYER (HOOP WINDING)

S130 : CUT WINDING START END FIBER

S140 : FORM OUTER HELICAL LAYER (HELICAL WINDING)

S150 : REPEAT FORMATION OF HOOP LAYERS (S130) AND FORMATION OF HELICAL LAYERS (S140)

S160 : COMPLETE (INTERMEDIATE PRODUCT TANK)

HIGH-PRESSURE GAS TANK PRODUCTION METHOD

CROSS-REFERENCE TO RELATED APPLICATIONS

This is a national phase application based on the PCT International Patent Application No. PCT/JP2013/000611 filed Feb. 5, 2013, claiming priority to Japanese patent application No. 2012-039982 filed Feb. 27, 2012, the entire contents of both of which are incorporated herein by reference.

TECHNICAL FIELD

The present invention relates to a high-pressure gas tank production method that forms a fiber-reinforced layer on a liner.

BACKGROUND ART

Recently developed vehicles are driven with combustion energy of a fuel gas or with electrical energy generated by electrochemical reaction of a fuel gas. A high-pressure gas tank that stores fuel gas such as natural gas or hydrogen may be mounted on the vehicle. There has accordingly been a demand for weight reduction of the high-pressure gas tank. A fiber-reinforced plastic high-pressure gas tank has been employed for this purpose, where a hollow liner is coated with carbon fiber-reinforced plastic or glass fiber-reinforced plastic (hereinafter collectively referred to as fiber-reinforced resin layer). In terms of weight reduction, a resin hollow container having the gas barrier properties is generally used for the liner.

Filament winding technique (hereinafter referred to as FW technique) is employed for production of such a high-pressure gas tank. A fiber-reinforced resin layer is formed on the liner by repeatedly winding a fiber impregnated with a thermosetting resin such as epoxy resin on the outer circumference of the liner by this FW technique (for example, Patent Literature 1). Formation of the fiber-reinforced resin layer alone gives only a half-finished product. Thermally curing the thermosetting resin contained in this resin layer after formation of the resin layer produces a high-pressure gas tank where the liner is coated and reinforced with the fiber-reinforced resin layer.

CITATION LIST

Patent Literature

PLT 1: JP 2010-5965A

SUMMARY

Technical Problem

The liner is formed by joining dome sections in a convex curve shape with both ends of a cylinder section in a tubular shape. The FW technique employs different winding methods for the cylinder section and for the dome sections, in order to ensure the effectiveness of liner reinforcement. More specifically, the FW technique employs hoop winding for fiber winding of the cylinder section to repeatedly wind the fiber over the entire outer surface of the cylinder section and employs helical winding for repeatedly winding the fiber spanned between the dome sections on both ends of the cylinder section to reverse the winding direction at the respective dome section. A plurality of hoop layers by hoop winding and a plurality of helical layers by helical winding are formed to be laid one upon the other, so as to form the fiber-reinforced resin layer as the whole.

In the high-pressure gas tank having the liner reinforced by the fiber-reinforced resin layer formed by the conventional FW technique, in terms of ensuring the strength, it is desirable that there is no substantial non-fiber-woven space between an outer surface of the liner and a layer close to the outer surface as well as between respective layers of the fiber-reinforced resin layer. A non-fiber-woven space is, however, left in the periphery of a mouthpiece provided on the top of the dome section of the liner. The presence of this non-fiber-woven space may cause delamination of the fiber-reinforced rein layer and may accordingly reduce the reinforcement strength.

In order to solve the problems described above, an object of the invention is to suppress a non-fiber-woven space from being left in the process of forming a fiber layer for reinforcement on a liner by filament winding technique.

Solution to Problem

In order to achieve at least part of the above objects, the invention may be implemented by any of the following aspects.

According to Aspect 1, there is provided a high-pressure gas tank production method of forming a fiber layer on a liner, which comprises a cylinder section in a tubular shape and dome sections in a convex curve shape joined with both ends of the cylinder section, by filament winding technique of repeatedly winding the fiber on an outer surface of the liner. The high-pressure gas tank production method forms the fiber layer by laminating a plurality of layers of a hoop layer formed by hoop winding of repeatedly winding the fiber over an entire outer surface of the cylinder section and a helical layer formed by helical winding of reversing a winding direction at the respective dome sections. Forming the fiber layer comprises: fixing a winding start end of the fiber at a fixation position that is away from the cylinder section in a direction opposite to the cylinder section, for formation of an innermost helical layer closest to the outer surface of the liner out of the helical layers, and forming the innermost helical layer from the fiber extended from the fixation position; forming the hoop layer as an inner hoop layer over the innermost helical layer; and cutting the fiber extended from the fixation position during formation of the innermost helical layer on a periphery of top of the dome section after formation of the inner hoop layer, and forming the helical layer to be laid over the inner hoop layer.

The high-pressure gas tank production method of Aspect 1 forms the fiber layer on the outer surface of the liner by laminating the plurality of layers of the hoop layer and the helical layer. Forming the innermost helical layer that is closest to the outer surface of the liner among the helical layers first fixes the winding start end of the fiber at the fixation position that is away from the cylinder section in the direction opposite to the cylinder section. The fiber is extended from this fixation position to the dome section, and the innermost helical layer is formed from the fiber extended from the fixation position. The hoop layer is formed as the inner hoop layer over this innermost helical layer, so that the inner hoop layer holds the innermost helical layer in the cylinder section over which the inner hoop layer is formed. This restricts the motion of the fiber repeatedly wound for formation of the innermost helical layer in the cylinder section. The innermost helical layer is accordingly left with no loosened fiber in the range of the outer surface of the dome sections as well as the cylinder section.

The high-pressure gas tank production method of Aspect 1 described above cuts the fiber which is extended from the fixation position that is distant from the top of the dome section, in the periphery of the top of the dome section, before forming the helical layer on the inner hoop layer that holds the innermost helical layer as described above. The fiber which is not cut but is left and is helically wound for formation of the innermost helical layer is accordingly freed from the tension of winding for formation of the innermost helical layer and is left on the helical winding track along the outer surface of the dome section from the top of the dome section as the cutting position of the fiber. This method does not cause a pull of the fiber by the tension of helical winding for formation of the innermost helical layer or a position shift from the winding track in the periphery of the top of the dome section. The thickness of the helical layer by laminating the fiber on the outer surface of the dome including the periphery of the top of the dome section is accordingly maintained. The high-pressure gas tank production method of the above Aspect 1 forms the helical layer over the inner hoop layer after cutting the fiber as described above.

The high-pressure gas tank production method of Aspect 1 described above does not need to repeatedly wind and fix the fiber on the circumferential wall of the mouthpiece for formation of the innermost helical layer and causes the thickness of the helical layer to be maintained by cutting the fiber extended from the fixation position of the winding start end at the top of the dome section to be freed from the tension.

The conventional FW technique, on the other hand, repeatedly winds and fixes the fiber from it winding start end on the circumferential wall of the mouthpiece at the top of the dome section and then repeatedly winds the fiber from this fixation position of the mouthpiece by helical winding and hoop winding. The innermost helical layer and the adjacent helical layer are thus affected by the location of the winding start fiber for formation of the innermost helical layer at the fixation position of the mouthpiece and by the tension of fiber winding at the fixation position of the mouthpiece. This may cause a partial increase in wall thickness and may cause a level difference between layers. In the process of forming the innermost helical layer, the fiber receives the tension of fiber winding. A force of shifting the fiber from the helical winding track may act on the fiber by the effects of the position of the above winding start fiber and the winding technique of the fiber at the fixation position of the mouthpiece. Such a partial variation in wall thickness and the behaviors of the fiber may cause a non-fiber-wound space to be left in the innermost helical layer in the periphery of the mouthpiece mounted on the top of the dome section of the liner.

The high-pressure gas tank production method of Aspect 1 described above does not repeatedly wind the fiber on the circumferential wall of the mouthpiece for fixation as described above. This accordingly does not leave a non-fiber-wound space in the periphery of the mouthpiece in the process of forming the fiber layer for reinforcement on the liner by filament winding technique. This method readily produces the high-pressure gas tank with suppressing a non-fiber-wound space from being left and suppressing reduction of the reinforcement strength.

The high-pressure gas tank production method of Aspect 1 described above may be implemented by various embodiments. For example, the innermost helical layer may be a helical layer wound directly on the outer surface of the liner to be formed first. This method alternately and successively forms the helical layer over the innermost hoop layer and forms the hoop layer over the helical layer after foremost formation of the innermost helical layer, subsequent formation of the inner hoop layer and cutting of the fiber.

The fiber winding start end for formation of the inner most helical layer may be fixed to a shaft that pivotally supports the liner. The FW technique originally uses the shaft to pivotally support the liner. This aspect accordingly does not need any exclusive member for fixation of the winding start end or any additional structure to hold the exclusive member, thus simplifying the structure.

DESCRIPTION OF EMBODIMENTS

Figure 1A:
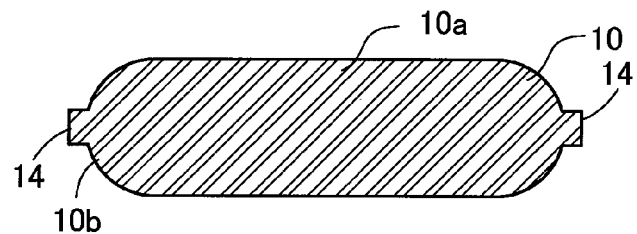
FIG. 1A to FIG. 1C are diagrams schematically illustrating a high-pressure gas tank production method according to an embodiment of the invention.
Figure 1B:
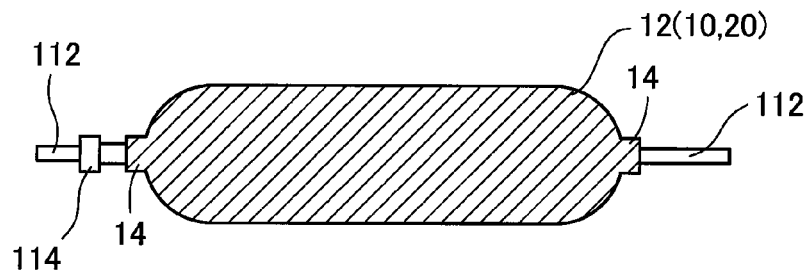
Figure 1C:
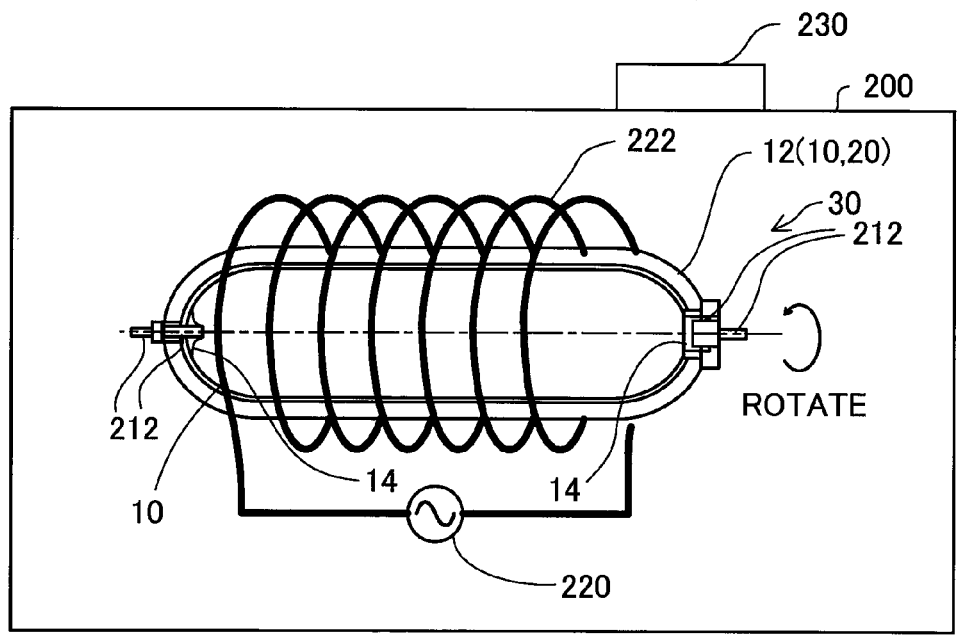
Figure 2A:
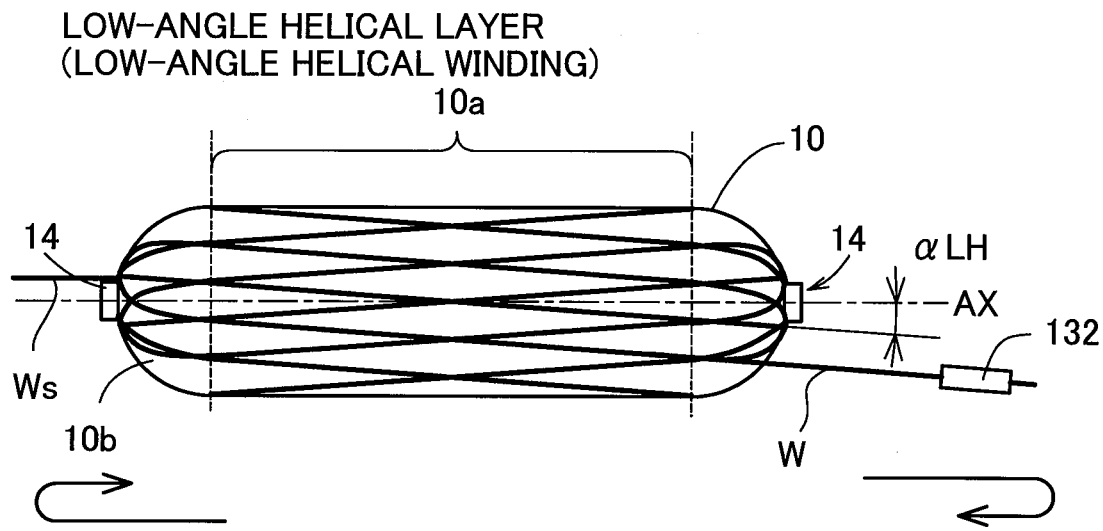
FIGS. 2A and 2B are diagrams illustrating formation of a fiber-reinforced resin layer.
Figure 2B:
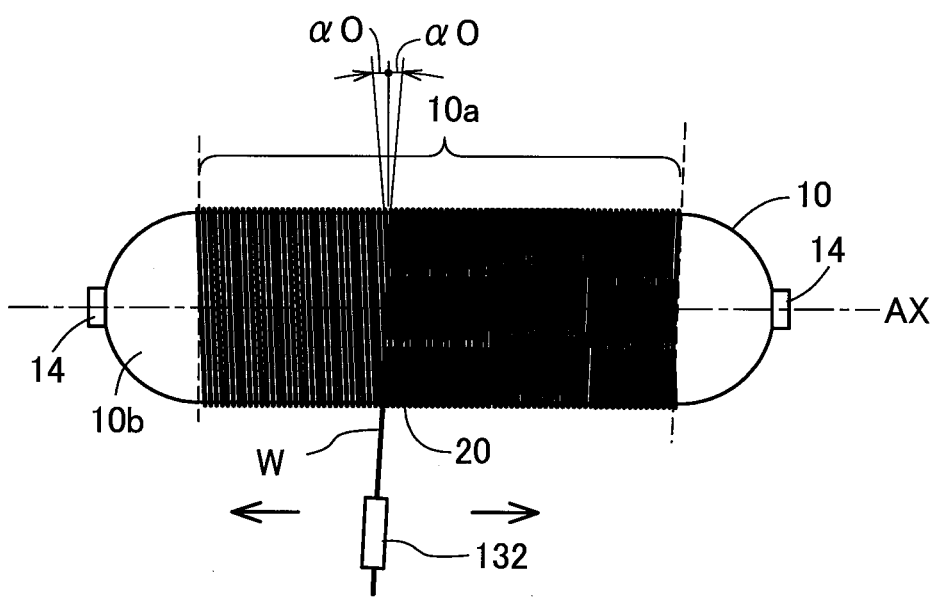

The following describes embodiments of the invention with reference to accompanied drawings. FIG. 1A to FIG. 1C are diagrams schematically illustrating a high-pressure gas tank production method according to an embodiment of the invention. FIGS. 2A and 2B are diagrams illustrating formation of a fiber-reinforced resin layer. In this embodiment, the high-pressure gas tank is a high-pressure hydrogen tank configured to store high-pressure hydrogen.

The tank production method first provides a rein container having the gas barrier properties to hydrogen gas as a liner 10 as shown in FIG. 1A. The liner 10 includes a cylinder section 10a in a substantially tubular shape having a constant radius and dome sections 10b in a convex curve shape placed on both ends of the cylinder section 10a. The dome section 10b is formed from a uniform stress surface and has mouthpieces 14 to be connected with, for example, an external piping. According to this embodiment, the resin container used is made of a nylon-based resin. The resin container used may, however, be made of another resin that has the gas barrier properties to hydrogen gas.

The tank production method subsequently forms a fiber-reinforced resin layer 20 on the outer circumference of the liner 10 (fiber-reinforced resin layer formation process). This fiber-reinforced resin layer formation process repeatedly winds a carbon fiber impregnated with an epoxy resin that is a thermosetting resin, on the outer circumference of the liner 10, so as to form a carbon fiber layer as the fiber-reinforced resin layer 20. The process accordingly obtains an intermediate product tank 12 having the fiber-reinforced resin layer 20 in the resin uncured state on the outer circumference of the liner 10. This fiber-reinforced resin layer formation process will be described later.

After forming the fiber-reinforced resin layer 20, the tank production method thermally cures the fiber-reinforced resin layer 20. An induction heating apparatus 200 shown in FIG. 1C is used in this thermal curing process. This induction heating apparatus 200 is an apparatus for high-frequency induction heating of the intermediate product tank 12 as an object to be heated. The induction heating apparatus 200 pivotally supports the intermediate product tank 12 in a rotatable manner on a stand (not shown) via tank support shafts 212 mounted on both tank ends and rotates the intermediate product tank 12 by a motor (not shown) in the course of heating. An induction heating coil 222 is arranged to surround the pivotally-supported intermediate product tank 12 and receives supply of high-frequency electric current from a high-frequency power source 220 to form a magnetic flux and inductively heats the fiber-reinforced resin layer 20 as the carbon fiber in the fiber-reinforced resin layer 20 of the intermediate product tank 12 (resin-impregnated carbon fiber W) as the conductor.

The thermal curing process using the above induction heating apparatus 200 shown in FIG. 1C mounts the tank support shafts 212 on the intermediate product tank 12 with the fiber-reinforced resin layer 20 formed thereon, prior to conveyance of the intermediate product tank 12 into the induction heating apparatus 200. The tank support shafts 212 are inserted into the mouthpieces 14 on both ends of the intermediate product tank 12 and pivotally support the intermediate product tank 12 horizontally in the state that parts of the tank support shafts 212 are protruded from both tank ends. After pivotally supporting the intermediate product tank 12, the induction heating apparatus 200 makes the intermediate product tank 12 subject to the thermal curing process. This thermal curing process rotates the intermediate product tank 12 with the tank support shafts 212 at a constant speed and keep the rotation throughout the thermal curing process. Simultaneously with tank rotation or constant-speed rotation, the induction heating apparatus 200 supplies high-frequency electric current to the induction heating coil 222 by means of a controller 230 to inductively heat the fiber-reinforced resin layer 20, so as to thermally cure the above thermosetting resin (for example, epoxy resin) used for formation of the fiber-reinforced resin layer 20. This causes the thermosetting resin in the fiber-reinforced resin layer 20 formed on the outer circumference of the liner 10 in the intermediate product tank 12 to be thermally cured approximately evenly around the outer circumference of the liner 10. Hot-air blow heating technique or a heating apparatus using a heater for heating may be employed alternatively for the same purpose.

After thermally curing the resin using the induction heating apparatus 200 as described above, the tank production method cools down and cures the heated intermediate product tank 12. Through this cooling and curing process, the tank production method completes a high-pressure hydrogen tank 30 with the fiber-reinforced resin layer 20 of the thermally-cured epoxy resin-impregnated fiber formed on the outer circumference of the liner 10.

The process of forming the fiber-reinforced resin layer 20 (FIG. 1B) is described in detail below. As shown in FIG. 2, this embodiment selectively uses helical winding and hoop winding to from the fiber-reinforced resin layer 20 from the resin-impregnated carbon fiber W by FW technique and repeatedly winds the resin-impregnated carbon fiber W on the dome sections 10b at both liner ends and on the outer circumference of the tubular cylinder section 10a. The process first winds the resin-impregnated carbon fiber W by low-angle helical winding shown in FIG. 2A. This resin-impregnated carbon fiber W is wound by multiple yarn feeding of a plurality of adjusted sliver carbon fibers with a thermosetting resin such as an epoxy resin on the surface of the sliver fibers and between the sliver fibers.

The target area of the low-angle helical winding of the fiber includes curved outer surface areas of the dome sections 10b and the hoop-wound cylinder section 10a. The low-angle helical winding process rotates the liner 10 about a tank center axis AX and adjusts the rotation speed of the liner 10 and the reciprocation speed of fiber feeders 132, which are the supply source of the resin-impregnated carbon fiber W, such as to wind the resin-impregnated carbon fiber W fed from the fiber feeders 132 with crossing the tank center axis AX at a low fiber angle $\alpha LH$ (for example, about 11 to 25 degrees). The low-angle helical winding process then moves the fiber feeders 132 forward and backward along the direction of the tank center axis AX and repeatedly and helically winds the resin-impregnated carbon fiber W to be spanned between the dome sections 10b at both ends of the cylinder section 10a. In this process, the fiber winding directions at the dome sections 10b on both ends are reversed along with switchover between the forward path and the backward path of the fiber feeders 132, and the positions of such reverse of the fiber winding direction from the tank center axis AX are also adjusted.

Many repetitions of reverse of the fiber winding direction at the dome sections 10b form fiber-wound layers of the resin-impregnated carbon fiber W stringed like a mesh at the low fiber angle $\alpha LH$ on the outer surface of the liner 10. In this process, the fiber feeders 132 move forward and backward to cover almost the entire area of the outer surfaces of the dome sections 10b with the resin-impregnated carbon fiber W and form several fiber-wound layers. These first several fiber-wound layers form an innermost helical layer placed on the innermost side of the fiber-reinforced resin layer 20.

After formation of the above helical layer, the fiber-reinforced resin layer formation process forms a hoop layer over the formed helical layer. Formation of the hoop layer is shown in FIG. 2B. The process repeatedly reverses the direction of hoop winding at both ends of the cylinder section 10a to form the hoop layer. More specifically, the process moves fiber feeders 132 forward and backward along the tank center axis AX at a specified speed, while rotating the liner 10 about the tank center axis AX, so as to wind the resin-impregnated carbon fiber W and form the hoop layer over the formed helical layer. This hoop winding process adjusts the rotation speed of the liner 10 and the reciprocation speed of the fiber feeders 132, such as to wind the resin-impregnated carbon fiber W fed from the fiber feeders 132 with crossing the tank center axis AX of the cylinder section 10a at a winding angle nearly perpendicular to the tank center axis AX (fiber angle $\alpha 0$, for example, about 89 degrees). The hoop winding process then moves the fiber feeders 132 forward and backward along the direction of the tank center axis AX and repeatedly winds the resin-impregnated carbon fiber W in the range of the cylinder section 10a.

Many repetitions of reverse of the fiber winding direction on the cylinder section 10a form a hoop layer of the resin-impregnated carbon fiber W stringed like a mesh at a high fiber angle $\alpha LH$ on the outer surface of the formed helical layer. In this process, the fiber feeders 132 move forward and backward to repeatedly wind the resin-impregnated carbon fiber W and form several fiber-wound layers over the entire area of the cylinder section 10a. These several fiber-wound layers form the hoop layer.

The winding is changed from the helical winding for formation of the helical layer to the hoop winding for formation of the hoop layer by adjusting the rotation speed of the intermediate product tank 12 and adjusting the reciprocation speed of the fiber feeders 132. In the course of changing the winding from the low-angle helical winding described above to the hoop winding, high-angle helical winding may be added to wind the resin-impregnated carbon fiber W at a high fiber angle (for example, about 30 to 60 degrees) to the tank center axis AX.

Figure 3:
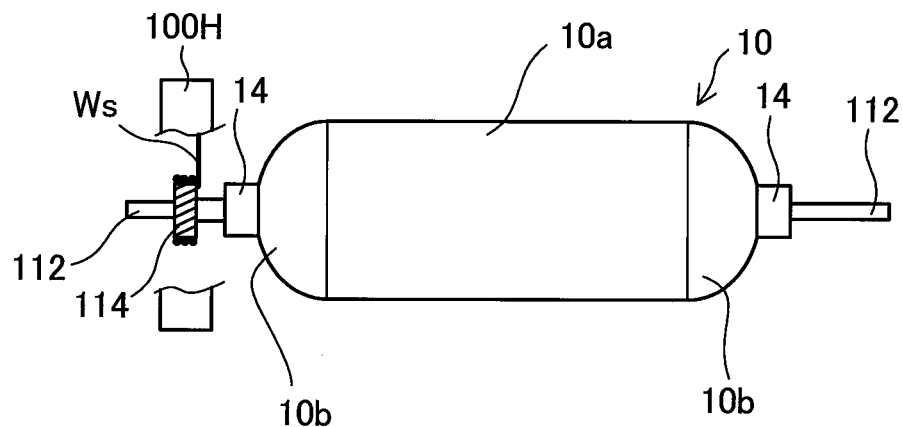
FIG. 3 is a diagram illustrating initial steps in a fiber-reinforced resin layer formation process.
Figure 3:
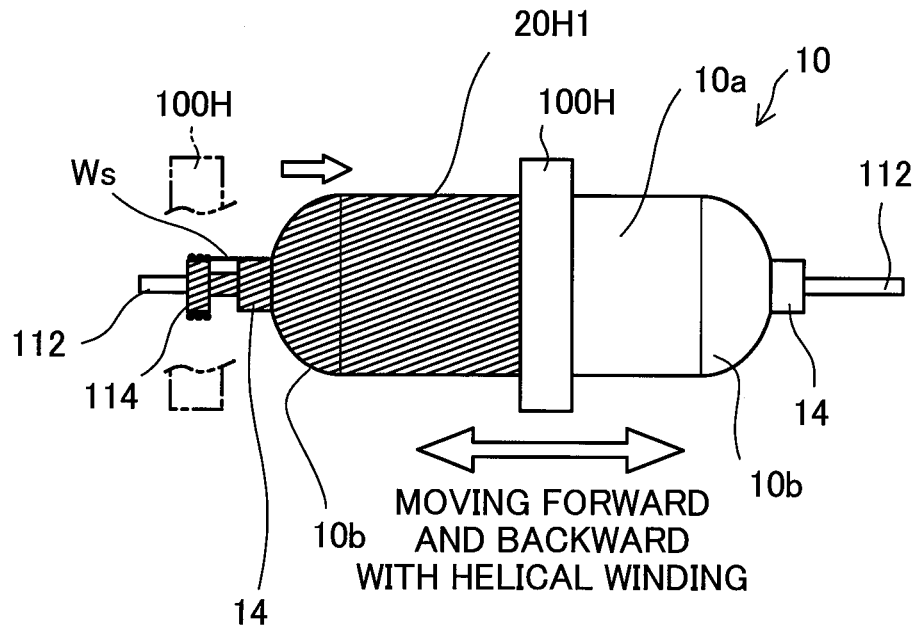
Figure 4:
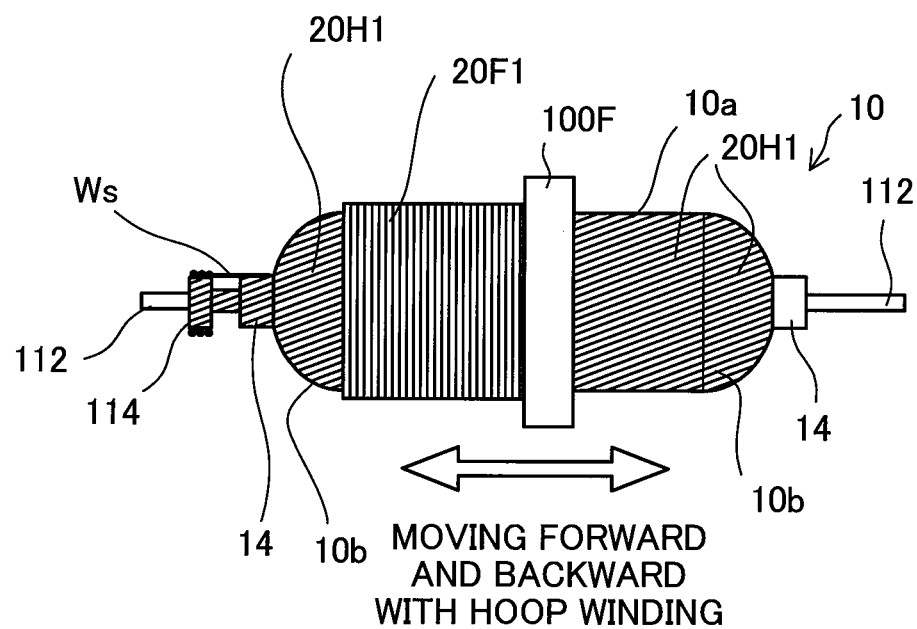
FIG. 4 is a diagram illustrating middle steps in the fiber-reinforced resin layer formation process.
Figure 4:
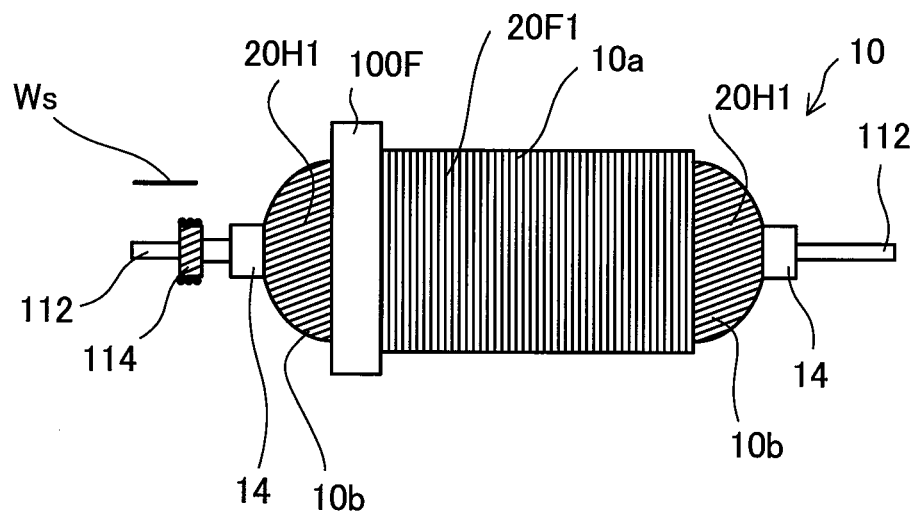
Figure 5:
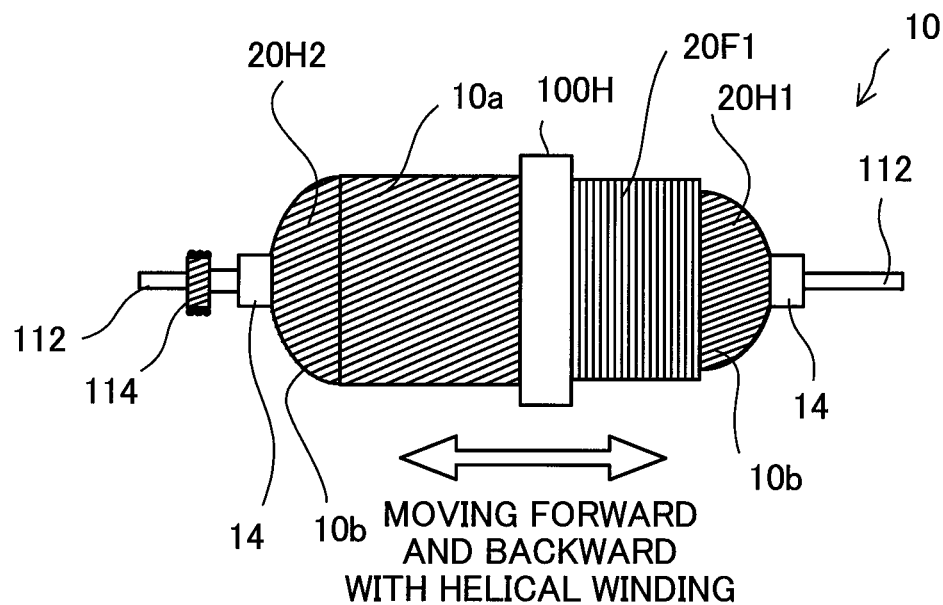
FIG. 5 is a diagram illustrating final steps in the fiber-reinforced resin layer formation process.
Figure 5:
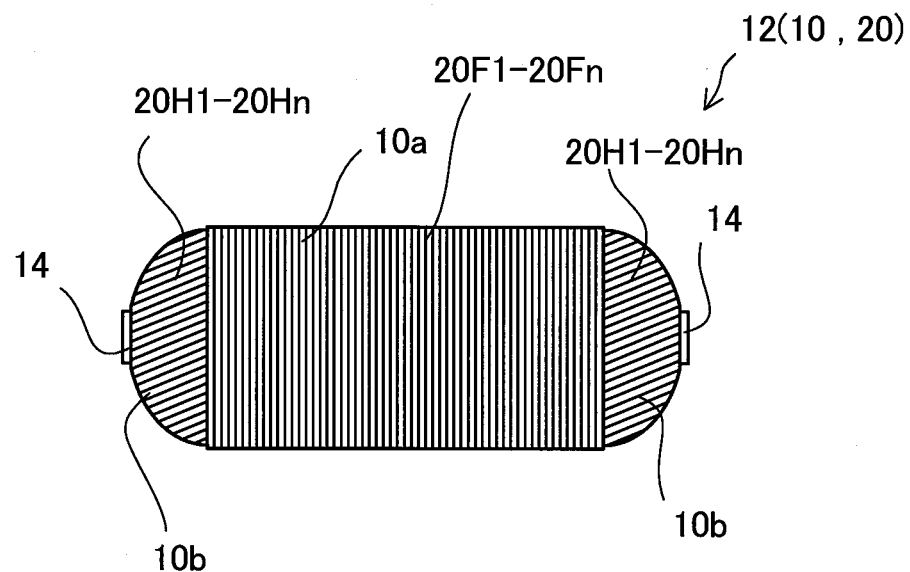

Selectively using the hoop winding and the helical winding of the resin-impregnated carbon fiber W as described above forms the hoop layer over the innermost helical layer formed on the outer circumference of the liner 10 and alternately forms the helical layers and the hoop layers to be laid one over the other, so as to eventually form the fiber-reinforced resin layer 20 by the FW technique. The process accordingly obtains the intermediate product tank 12 with the fiber-reinforced resin layer 20 formed on the outer circumference of the liner 10 by winding of the resin-impregnated carbon fiber W by the FW technique (FIG. 1B). More specifically, the process of the embodiment obtains the intermediate product tank 12 by the following steps. FIG. 3 is a diagram illustrating initial steps in the fiber-reinforced resin layer formation process. FIG. 4 is a diagram illustrating middle steps in the fiber-reinforced resin layer formation process. FIG. 5 is a diagram illustrating final steps in the fiber-reinforced resin layer formation process.

The fiber-reinforced resin layer formation process shown in FIG. 1B and FIGS. 2A and 2B mounts liner support shafts 112 on the liner 10, prior to the fiber winding. The liner support shafts 112 are inserted into the mouthpieces 14 on both ends of the liner 10 and pivotally support the liner 10 horizontally in the state that parts of the liner support shafts 112 are protruded from both liner ends. After pivotally supporting the liner 10, as shown in FIG. 3, the fiber-reinforced resin layer formation process fixes a winding start end with a helical winding unit 100H of an FW apparatus (not shown) (step S100). This helical winding unit 100H is a ring-shaped unit to surround the liner 10 and has a plurality of the above fiber feeders 132 arranged at equal pitches. The respective fiber feeders 132 feed the resin-impregnated carbon fiber W to form the low-angle helical layer (FIG. 2A) described above.

At first step S100, the helical winding unit 100H is moved to a fiber fixation flange 114 provided on the liner support shaft 112. The fiber fixation flange 114 is placed on the liner support shaft 112 to be away from the top of the dome section 10b of the liner 10. The process feeds the resin-impregnated carbon fiber W from the helical winding unit 100H onto the outer periphery of the fiber fixation flange 114, while rotating the liner 10, so as to wind the resin-impregnated carbon fiber W on the outer periphery of the fiber fixation flange 114. The process then fixes the resin-impregnated carbon fiber W on the fiber fixation flange 114 at this winding position. A ring-shaped anchorage or the like is used for fixation of the fiber, and a winding start end fiber Ws of the resin-impregnated carbon fiber W is extended from this fixation position.

At subsequent step S110, the process forms an innermost helical layer 20H1 on the innermost side of the fiber-reinforced resin layer 20. More specifically, the process first adjusts the rotation speed of the liner 10 to a suitable speed for the low-angle helical winding shown in FIG. 2A and rotates the liner 10. The process subsequently moves the helical winding unit 100H toward the top of the dome section 10b of the liner 10. The winding start end fiber Ws extended from the fixation position of the fiber fixation flange 114 is accordingly wound on the liner support shaft 112 and the mouthpiece 14. While keeping rotation of the liner 10, the process moves the helical winding unit 100H forward and backward a predetermined number of times and feeds the fiber from the fiber feeders 132 to form the low-angle helical layer shown in FIG. 2A. This forms the innermost helical layer 20H1 which is the low-angle helical layer, from the resin-impregnated carbon fiber W fed subsequent to the winding start end fiber Ws extended from the fixation position of the fiber fixation flange 114.

At subsequent step S120, as shown in FIG. 4, the process uses a hoop winding unit 100F to form an inner hoop layer 20F1 over the innermost helical layer 20H1. Like the helical winding unit 100H, the hoop winding unit 100F is a ring-shaped unit to surround the liner 10 and has a plurality of the fiber feeders 132 for formation of the hoop layer arranged at equal pitches. The respective fiber feeders 132 feed the resin-impregnated carbon fiber W to form the hoop layer (FIG. 2B) described above. The process of forming the inner hoop layer 20F1 using this hoop winding unit 100F first adjusts the rotation speed of the liner 10 to a suitable speed for the hoop winding shown in FIG. 2B and rotates the liner 10. While keeping rotation of the liner 10, the process moves the hoop winding unit 100F forward and backward a predetermined number of times and feeds the fiber from the fiber feeders 132 to form the hoop layer shown in FIG. 2B. This forms the inner hoop layer 20F1 from the resin-impregnated carbon fiber W over the innermost helical layer 20H1 previously formed at step S110. The formed inner hoop layer 20F1 holds the innermost helical layer 20H1 in the cylinder section 10a over which the inner hoop layer 20F1 is formed.

At step S130 after formation of the inner hoop layer 20F1 using the hoop winding unit 100F, the process cuts and removes the winding start end fiber Ws extended from the fixation position of the fiber fixation flange 114 and wound on the liner support shaft 112 and the mouthpiece 14. The cutting position is on the periphery of the top of the dome section 10b and is in the vicinity of the outer surface of the mouthpiece 14.

At subsequent step S140, as shown in FIG. 5, the process again uses the helical winding unit 100H to form another low-angle helical layer shown in FIG. 2A. The currently formed helical layer is a second inner helical layer (second helical layer 20H2) to cover over the inner hoop layer 20F1 formed over the innermost helical layer 20H1.

At subsequent step S150, the process alternately repeats formation of the hoop layer using the hoop winding unit 100F (step S130) and formation of the helical layer using the helical winding unit 100H (step S140) a predetermined number of times and then removes the liner support shafts 112. The number of repetitions n is determined according to the thickness of the fiber-reinforced resin layer 20, the thickness of each helical layer and the thickness of each hoop layer. On completion of such repetitions (step S160), the process forms the fiber-reinforced resin layer 20 on the outer surface of the liner 10, such that the helical layers and the hoop layers are alternately laid one over the other from the innermost helical layer 20H1, the inner hoop layer 20F1, the second helical layer 20H2 to an n-th helical layer 20Hn and an n-th hoop layer 20Fn, and obtains the intermediate product tank 12. The obtained intermediate product tank 12 is subject to the above high-frequency induction heating of the fiber-reinforced resin layer 20 using the induction heating apparatus 200 shown in FIG. 1C.

As described above, the high-pressure hydrogen tank production method of the embodiment alternately forms the hoop layers and the helical layers to be laid one over the other from the innermost helical layer 20H1 to the n-th hoop layer 20Fn, so as to form the fiber-reinforced resin layer 20 on the outer surface of the liner 10. The process of forming the innermost helical layer 20H1, which is closest to the outer surface of the liner 10, directly on the outer surface of the liner 10 winds and fixes the winding start end fiber Ws of the resin-impregnated carbon fiber W fed from the helical winding unit 100H, on the fiber fixation flange 114 of the liner support shaft 112 (step S100, FIG. 3). The fiber fixation flange 114 is away from the top of the dome section 10b of the liner 10, so that the winding start end fiber Ws is extended from the fixation position on the outer periphery of the fiber fixation flange 114 toward the dome section 10b. The resin-impregnated carbon fiber W fed from the helical winding unit 100H subsequent to the winding start end fiber Ws extended to the dome section 10b is spanned between the dome sections 10b on both ends of the liner 10 and is wound on the liner 10 by low-angle helical winding, so as to form the innermost helical layer 20H1.

After formation of this innermost helical layer 20H1, the resin-impregnated carbon fiber W fed from the hoop winding unit 100F is wound by high-angle hoop winding in the range of the cylinder section 10a of the liner 10, so as to form the hoop layer. The target area of this hoop winding of the fiber is the innermost helical layer 20H1 formed previously, so that the hoop layer is formed over the innermost helical layer 20H1 to form the inner hoop layer 20F1. This inner hoop layer 20F1 holds the innermost helical layer 20H1 in the cylinder section 10a over which the inner hoop layer 20F1 is formed. This restricts the motion of the resin-impregnated carbon fiber W repeatedly wound for formation of the innermost helical layer 20H1, in the cylinder section 10a. The innermost helical layer 20H1 is accordingly left with no loosened fiber in the range of the outer surface of the dome sections 10b as well as the cylinder section 10a.

The high-pressure hydrogen tank production method of the embodiment forms the innermost helical layer 20H1 and the inner hoop layer 20F1 in this order and then alternately repeats formation of helical layers by helical winding and formation of hoop layers by hoop winding a predetermined number of times, so as to form the fiber-reinforced resin layer 20 (step S150, FIG. 5). Before forming the second helical layer 20H2 subsequent to the inner hoop layer 20F1 that holds the innermost helical layer 20H1, the method cuts the winding start end fiber Ws extended from the fiber fixation position of the fiber fixation flange 114, which is away from the top of the dome section 10b. and wound on the liner support shaft 112 and the mouthpiece 14, at the position in the vicinity of the outer surface of the mouthpiece 14 on the periphery of the top of the dome section 10b. The fiber wound on the liner 10 for formation of the innermost helical layer 20H1 is freed from the tension of helical winding by cutting the winding start end fiber Ws and is left on the helical winding track along the outer surface of the dome section 10b from the cutting position. This method does not cause a pull of the fiber by the tension of helical winding or a position shift from the winding track (helical winding track). The thickness of the innermost helical layer 20H1 is accordingly maintained over the entire wound area including the periphery of the top of the dome section 10b.

The high-pressure hydrogen tank production method of the embodiment forms the second helical layer 20H2 to the n-th helical layer 20Hn over the innermost helical layer 20H1 which maintains its thickness. The winding start end of the second helical layer 20H2 or each of the subsequent helical layers is the winding terminal end of a previous hoop layer and does not affect the thickness of the layer. In the innermost helical layer 20H1, the resin-impregnated carbon fiber W is helically wound, while the winding start end fiber Ws is fixed to the fiber fixation flange 114 away from the mouthpiece 14 in the tank axis direction. This facilitates winding on the periphery of the circumferential wall of the mouthpiece 14. This method also facilitates formation of the second helical layer 20H2 and each of the subsequent helical layers. The high-pressure hydrogen tank production method of the embodiment does not need fixation of the fiber by repeatedly winding the fiber on the circumferential wall of the mouthpiece 14 for formation of the innermost helical layer 20H1 and enables the innermost helical layer 20H1 to maintain its thickness. As a result, the high-pressure hydrogen tank production method of the embodiment forms the fiber-reinforced resin layer 20 for reinforcement on the liner 10 by the FW technique without leaving a substantial non-fiber-wound space on the periphery of the mouthpiece 14. The high-pressure hydrogen tank production method of the embodiment suppresses a non-fiber-wound space from being left on the periphery of the mouthpiece 14 and thereby facilitates production of the high-pressure hydrogen tank 30 having the fiber-reinforced resin layer 20 with suppressing reduction of the reinforcement strength.

The high-pressure hydrogen tank production method of the embodiment forms the innermost helical layer 20H1 first by directly winding the resin-impregnated carbon fiber W on the outer surface of the liner 10. This method forms the second helical layer 20H2 over the inner hoop layer 20F1 and alternately and successively forms a second hoop layer 20F2 over the second helical layer 20H2 to the n-th helical layer 20Hn and the n-th hoop layer 20Fn after foremost formation of the inner-most helical layer 20H1, subsequent formation of the inner hoop layer 20F1 and cutting of the winding start end fiber Ws.

The high-pressure hydrogen tank production method of the embodiment provides the fiber fixation flange 114 used to fix the winding start end fiber Ws on the liner support shaft 112 which is essentially required for pivotal liner support during formation of the fiber-reinforced resin layer 20. This does not need any additional members exclusively used for fixing and holding the winding start end fiber Ws and thereby simplifies the structure.

The foregoing describes the embodiment of the invention. The invention is, however, not at all limited to this embodiment, but may be implemented as various other embodiments within the scope of the invention. For example, the above embodiment describes the high-pressure hydrogen tank 30 as the high-pressure gas tank. The invention is, however, not limited to the high-pressure hydrogen tank but may be applied to any high-pressure gas tank configured to store another high-pressure gas, such as natural gas.

The liner support shafts 112 mounted to pivotally support the liner 10 for formation of the fiber-reinforced resin layer 20 may also be used as the tank support shafts during the subsequent thermal curing process using the induction heating apparatus 200. This enables the intermediate product tank 12 to be supported in a stable position on its two ends via the liner support shafts 112 and keeps this position when being set in the induction heating apparatus 200. In the induction heating apparatus 200, the intermediate product tank 12 pivotally supported by the liner support shafts 112 is subject to high-frequency induction heating.

Cutting the winding start end fiber Ws at step S130 may be performed during formation of the inner hoop layer 20F1, instead of after formation of the inner hoop layer 20F1 at step S120.

REFERENCE SIGNS LIST

10 Liner
10a Cylinder section
10b Dome section
12 Intermediate product tank
14 Mouthpiece
20 Fiber-reinforced resin layer
20F1 Inner hoop layer
20F2 Second hoop layer
20H1 Innermost helical layer 20H2 Second helical layer
30 High-pressure hydrogen tank
100F Hoop winding unit
100H Helical winding unit
112 Liner support shaft
114 Fiber fixation flange
132 Fiber feeder
200 Induction heating apparatus
212 Tank support shaft
220 High-frequency power source
222 Induction heating coil
230 Controller
W Resin-impregnated carbon fiber
AX Tank center axis
Ws Winding start end fiber

The invention claimed is:

1. A high-pressure gas tank production method of forming a fiber layer on a liner by filament winding technique of repeatedly winding a fiber on an outer surface of the liner, wherein the liner comprises a cylinder section in a tubular shape and dome sections in a convex curve shape joined with both ends of the cylinder section, the high-pressure gas tank production method comprising:

forming the fiber layer by laminating a plurality of layers of hoop layers formed by hoop winding of repeatedly winding the fiber over an entire outer surface of the cylinder section and helical layers formed by helical winding of reversing a winding direction at the respective dome sections, wherein the forming the fiber layer comprises:

fixing a winding start end of the fiber at a fixation position that is away from the cylinder section in a direction opposite to the cylinder section, for formation of an innermost helical layer closest to the outer surface of the liner out of the helical layers, and forming the innermost helical layer from the fiber extended from the fixation position;

forming one of the hoop layers as an inner hoop layer over the innermost helical layer;

cutting the fiber extended from the fixation position during formation of the innermost helical layer on a periphery of top of the dome section after formation of the inner hoop layer and forming, after the cutting of the fiber extended from the fixation position, another helical layer to be laid over the inner hoop layer.

2. The high-pressure gas tank production method according to claim 1, wherein the innermost helical layer is a helical layer formed first by directly winding the fiber on the outer surface of the liner.

3. The high-pressure gas tank production method according to claim 1, wherein the winding start end of the fiber during formation of the innermost helical layer is fixed to a shaft for pivotally supporting the liner.

* * * * *